(12) United States Patent
Wurzer

(10) Patent No.: US 7,807,924 B2
(45) Date of Patent: Oct. 5, 2010

(54) POWER POST

(76) Inventor: David T. Wurzer, 26256 Olympic Ave., Carroll, IA (US) 51401

( * ) Notice: Subject to any disclaimer, the term of this patent is extended or adjusted under 35 U.S.C. 154(b) by 266 days.

(21) Appl. No.: 12/231,252

(22) Filed: Aug. 29, 2008

(65) Prior Publication Data

US 2010/0051310 A1 Mar. 4, 2010

(51) Int. Cl.
*H02G 3/18* (2006.01)
(52) U.S. Cl. ............. 174/59; 174/494; 174/45 R; 174/37; 174/38; 361/664; 361/665; 52/3
(58) Field of Classification Search ............. 174/37–39, 174/45 R, 493, 494, 59; 361/664, 665, 659; 439/92; 52/3
See application file for complete search history.

(56) References Cited

U.S. PATENT DOCUMENTS

| 4,015,397 | A | * | 4/1977 | Flachbarth et al. ............ 52/713 |
| 5,184,279 | A | * | 2/1993 | Horn ........................... 361/641 |
| 5,377,074 | A | * | 12/1994 | Byrd ........................... 361/664 |
| 5,586,742 | A | * | 12/1996 | Carter ......................... 248/545 |
| 6,667,437 | B2 | * | 12/2003 | Schenk ........................ 174/38 |
| 6,875,917 | B1 | * | 4/2005 | Wood et al. ................ 174/493 |
| 7,085,128 | B2 | * | 8/2006 | Wilfong ..................... 361/665 |
| 7,361,832 | B2 | * | 4/2008 | Dively ......................... 174/38 |

* cited by examiner

*Primary Examiner*—Dhiru R Patel
(74) *Attorney, Agent, or Firm*—Dennis L. Thomte; Thomte Patent Law Office LLC

(57) ABSTRACT

A power post includes of a vertically disposed post member having a lower end which is embedded in the ground and which has one or more of the following mounted in the front portion thereof: an electrical receptacle, a water-proof speaker, and/or an Ethernet receptacle.

17 Claims, 5 Drawing Sheets

POWER POST

BACKGROUND OF THE INVENTION

1. Field of the Invention

This invention relates to a power post and more particularly to a power post which includes at least one of an electrical outlet assembly, a speaker, or an Ethernet receptacle. More particularly, this invention relates to a weather-resistant, water-proof power post which is embedded in the ground for use in parks, rest areas, etc.

2. Description of the Related Art

Many types of power posts have been previously provided but it is not believed that any of the prior art power posts include an electrical outlet assembly, a speaker or an Ethernet receptacle therein. Further, it is not believed that any of the prior art power posts have the ability to close the compartment in which the electrical outlet assembly is mounted when an electrical plug is inserted into the electrical outlet assembly and maintain a U.L. "wet listed when in use" status.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

A power post is described which includes a hollow, vertically disposed post member having a lower end which is embedded in the ground, a closed upper end, a front wall, a back wall and opposite side walls. The front wall of the post member has a generally rectangular-shaped first opening formed therein adjacent the upper end thereof. An electrical outlet assembly is positioned in the post member inwardly of the first opening with the electrical outlet assembly including at least one, and preferably two electrical receptacles facing the first opening. A housing is positioned in the first opening and includes an upper end, a lower end, a back portion, a front portion, a top portion, a bottom portion and first and second side portions. The housing has a generally rectangular-shaped second opening formed therein which extends between the front and back portions thereof. The housing is secured to the electrical outlet assembly whereby the electrical receptacle or receptacles are positioned in the rectangular-shaped second opening adjacent the back portion of the housing. The front portion of the housing is positioned outwardly of the front wall of the post member.

A cover selectively closes the first opening at the front portion of the housing with the cover being selectively movable between open and closed positions. The cover is spaced from the electrical receptacles so that the cover may be moved to its closed position when an electrical plug is inserted into the electrical receptacle.

Preferably, but optionally, a water-proof speaker is positioned in the front wall of the post member below the electrical outlet assembly. Preferably, but optionally, an Ethernet receptacle is positioned in the front wall of the post member below the speaker.

It is therefore a principal object of the invention to provide a power post which has its lower end embedded in the ground and which has at least one of an electrical receptacle, speaker or Ethernet receptacle mounted in the front wall thereof.

A further object of the invention is to provide a power post including an electrical outlet assembly which is positioned within the post member in such a way so that an associated cover may be closed when a plug is inserted into the electrical receptacle.

A further object of the invention is to provide a power post including an electrical receptacle mounted in the front wall thereof and which is closed by a cover which may be locked.

A further object of the invention is to provide a power post which is economical of manufacture, durable in use and refined in appearance.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DESCRIPTION OF THE PREFERRED EMBODIMENT

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

Figure 1:
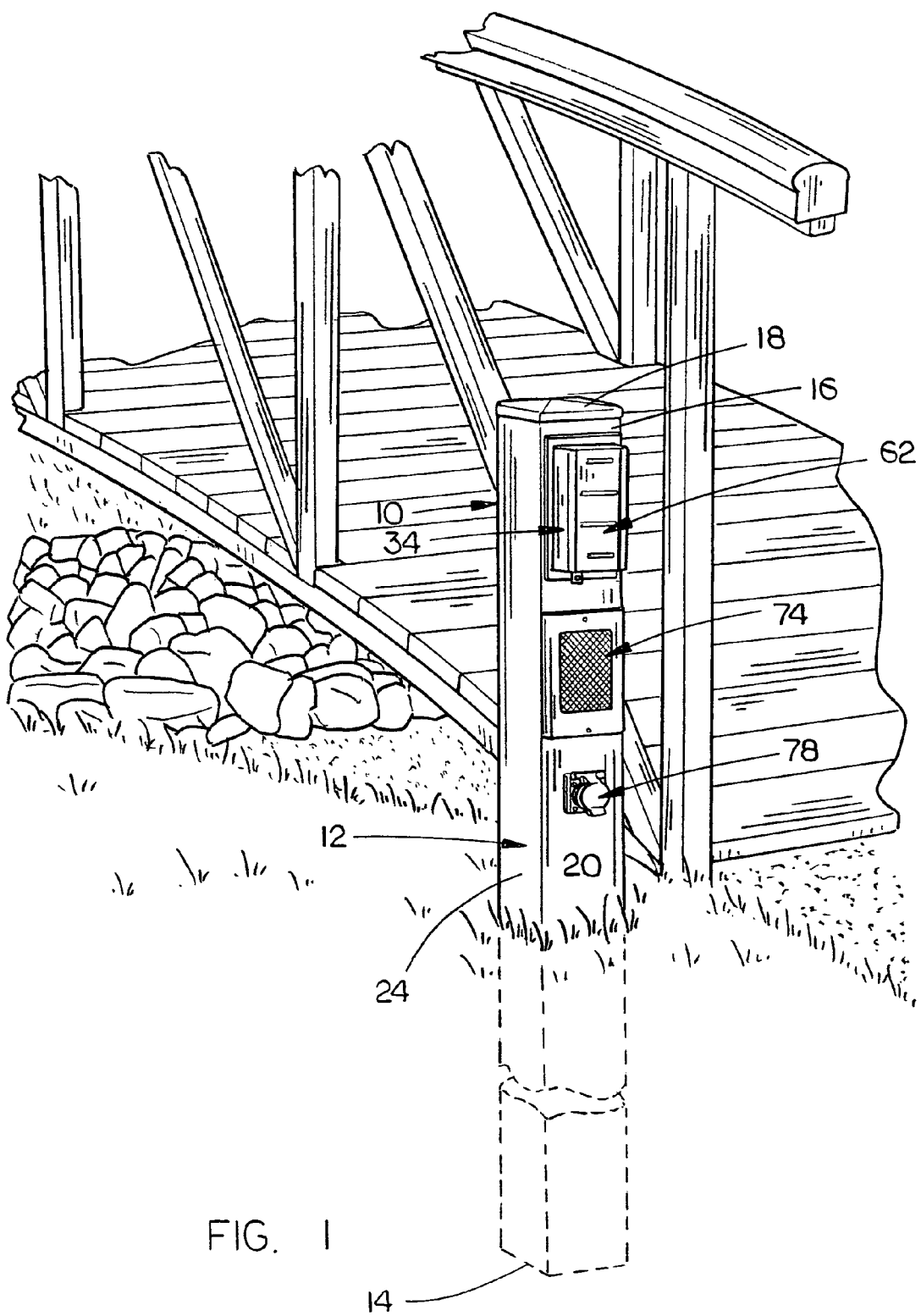
FIG. 1 is a perspective view of the power post of this invention being embedded in the ground adjacent a walking bridge.

The numeral 10 refers to the power post of this invention which is comprised of an elongated, vertically disposed post 12 which includes a lower end 14 and an upper end 16. The power post 10 is designed to be placed in parks, rest areas, etc. It is designed so that approximately the lower two feet thereof is embedded in the ground as illustrated in FIG. 1. Post 12 is hollow and is constructed of a galvanized steel material and which is powder coated so as to survive the elements. The upper end 16 of post 12 is closed by a cap 18. For purposes of description, post 12 will be described as having a front wall 20, back wall 22, and side walls 24 and 26.

Figure 2:
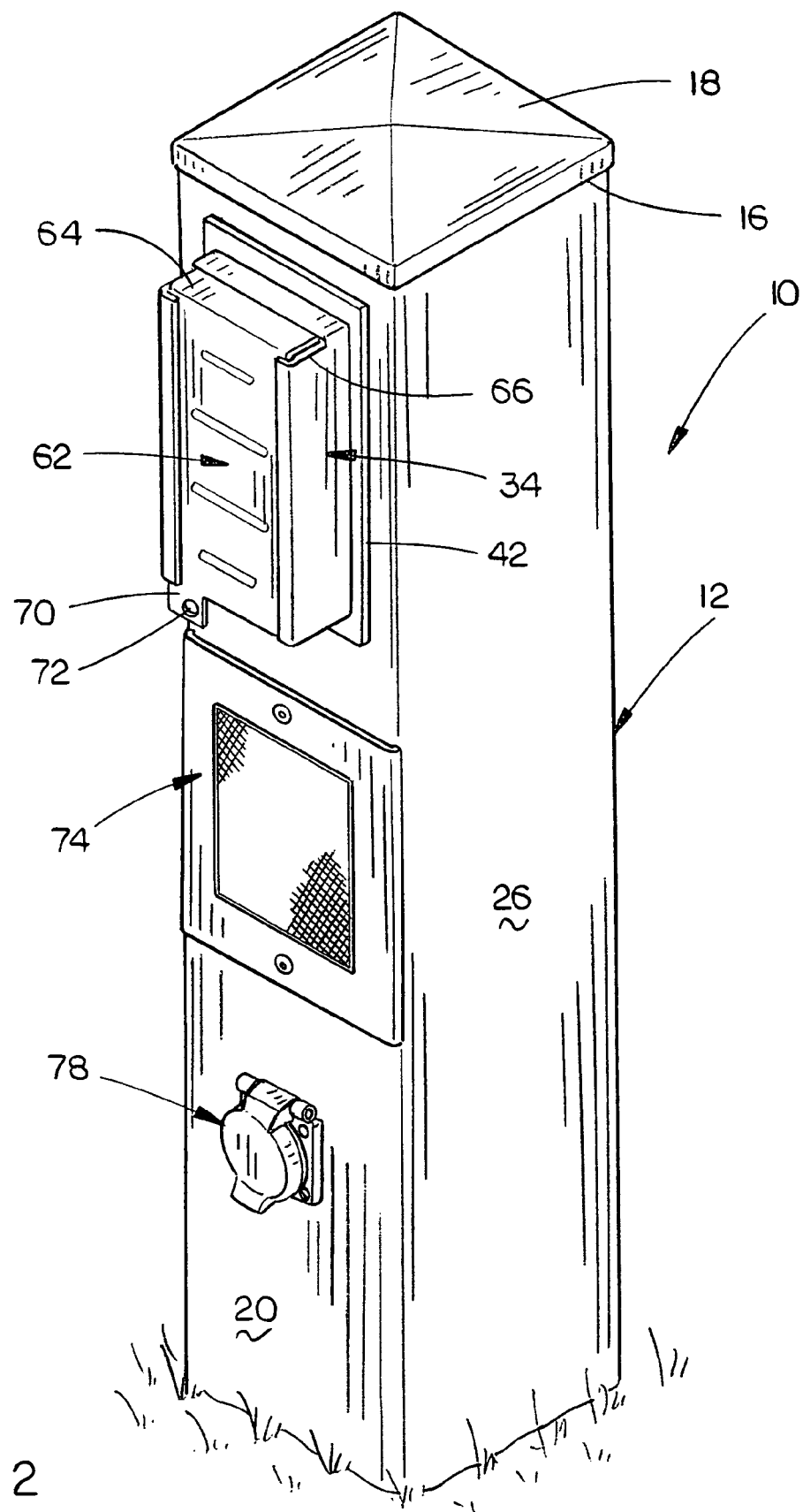
FIG. 2 is a front perspective view of the power post of this invention.

The numeral 28 refers to an electrical receptacle assembly having one or more, and preferably two electrical receptacles 30. The electrical receptacle assembly 28 is preferably positioned at the upper end of the post 12 as illustrated in the drawings. High voltage conduits 32 communicate with the lower end of the assembly 28 and will the have electrical leads or wires for the receptacles 30 positioned therein extending therethrough. Assembly 28 is held in position within the post 12 by means of a box-like housing 34 which is positioned in an opening 36 formed in front wall 20 of post 12. The opening 36 is generally rectangular in shape as is the box 34. Box 34 includes a back wall 38 having an opening 40 formed therein which receives the electrical receptacles 30. Box 34 is provided with an outwardly extending flange 42 which is positioned against the outer surface of front wall 20. Box 34 includes a top wall 44, bottom wall 46 and side walls 48 and 50. Box 34 is held in place by any convenient means and is secured to the front face of assembly 28 by screws 52. Side walls 48 and 50 have grooves or slots 54 and 56 formed therein which slidably receive the side edges 58 and 60 respectively of a slidable cover 62. Cover 62 has a rearwardly extending flange 64 at its upper end which is adapted to be received by the recessed portion 66 formed in the top wall 44 of box 34 to provide a water-proof connection between the flange 64 and the recess 66 when the cover 62 is in its closed position as illustrated in FIG. 2.

Figure 3:
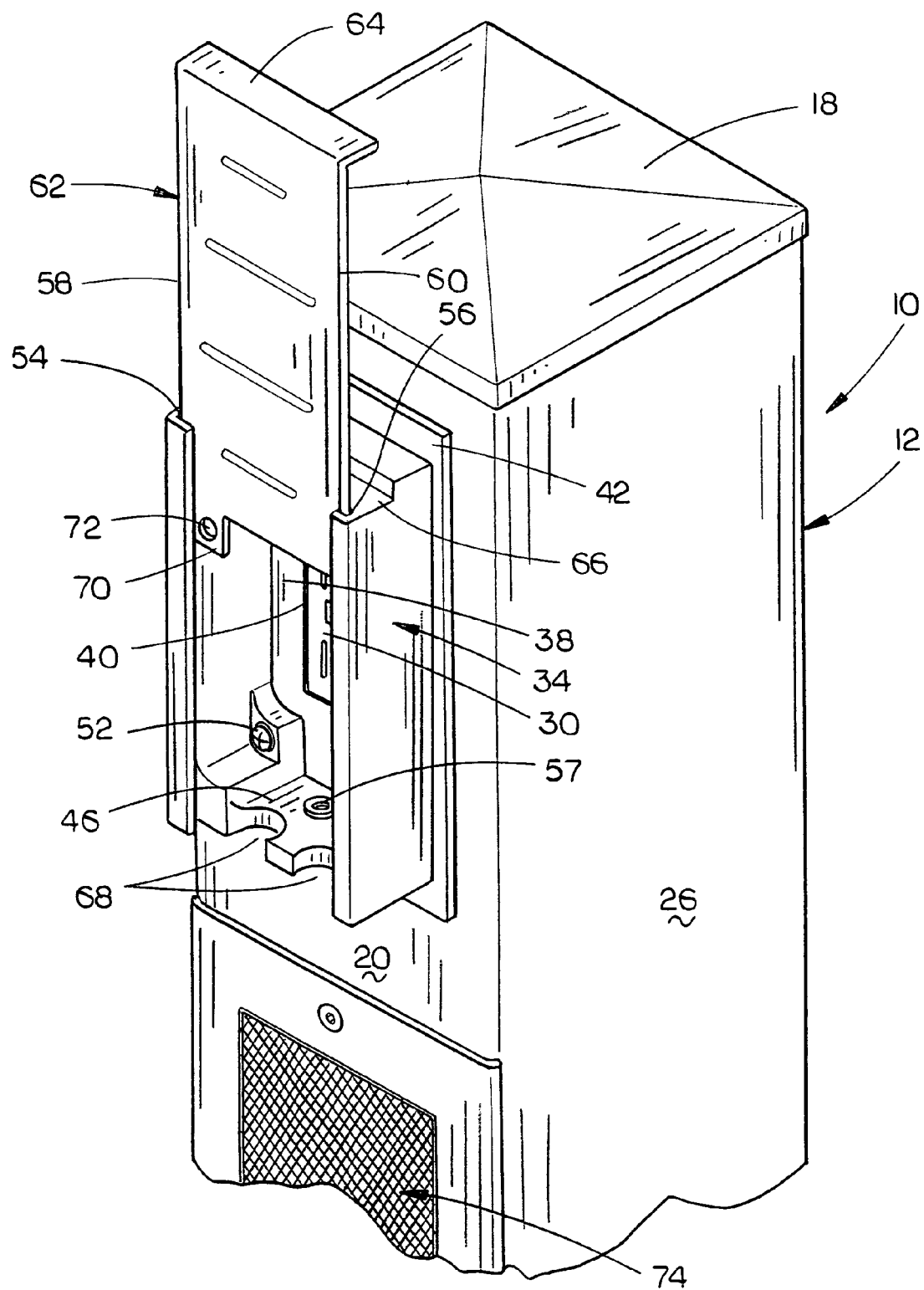
FIG. 3 is a view similar to FIG. 2 except that the cover has been raised to its open position.
Figure 4:
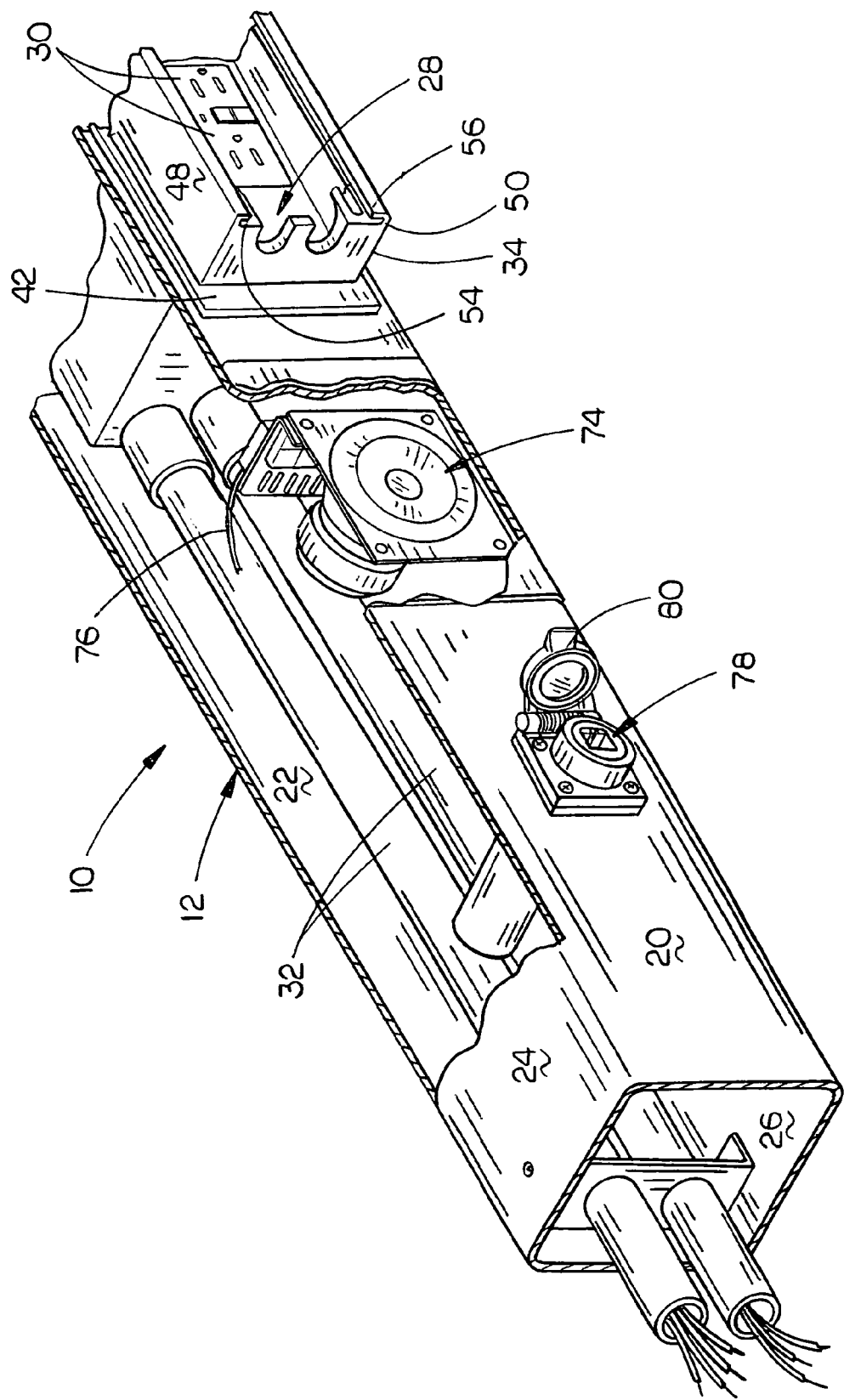
FIG. 4 is a partial perspective view of the power post of this invention with portions thereof cutaway to more fully illustrate the invention.
Figure 5:
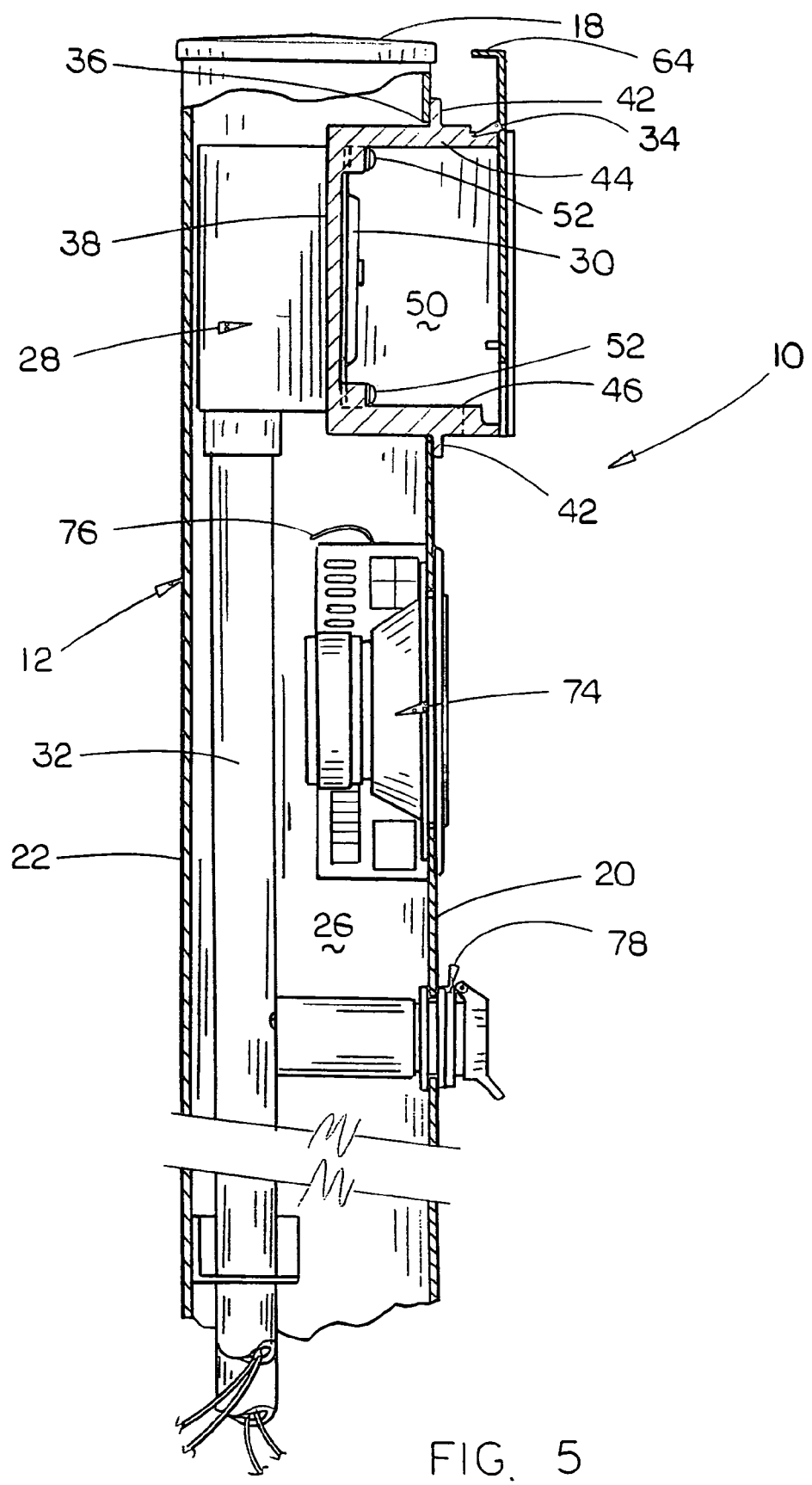
FIG. 5 is a partial sectional view of the power post of this invention.

As seen in FIG. 3, the bottom wall 46 of box 34 has a pair of semi-circular openings 68 formed therein which are adapted to receive the cords of an extension cord or the like when the male plugs of the extension cords are received in the receptacles 30. The receptacles 30 are positioned sufficiently rearwardly with respect to the front of the box 34 so that the cover 62 may be closed without interference from the plugs. The lower end of cover 62 is provided with a locking tab 70 which is positioned below bottom wall 46 of box 34 when the cover 62 is in its closed position so that a padlock or the like may be extended through the opening 72 and tab 70 to lock the cover 62 in its closed position.

The numeral 74 refers to a water-proof speaker which is mounted within the post 12 in a recess formed in the front wall 20. The speaker 74 is preferably constructed of polypropylene and is water proof. Leads 76 extend from the speaker 74 into the interior of the post 12. At the time of installation, the contractor will install a low voltage conduit in the post 12 to enclose the leads 76. The speaker 74 is designed to emit music, weather, etc. Speaker 74 is optional but is encouraged to enhance the utility of the power post 10.

The numeral 78 refers to a high-quality dust and water resistant Ethernet receptacle which includes a normally closed cap or cover 80. The receptacle 78 is optional but is also encouraged to provide additional utility and desirability of the power post 10. Leads (not shown) extend from the receptacle 78 into post 12. The contractor installing the post 12 will position the leads from the receptacle in the same low voltage conduit enclosing the leads 76 or will install an additional low voltage conduit for the leads of the receptacle 78.

The leads from the electrical receptacle assembly 28 are connected to a source of 110-115 volts AC current so that power may be supplied to lights or other electrical devices and which may also be used to charge laptops or the like. The Ethernet receptacle 78 enables a person sitting on a bench or the like adjacent the As power post 10 to gain quick and easy access to the Internet. The power post 10 will normally be sold without the conduits 32 which will be provided by the contractor installing the post 10.

Thus it can be seen that a novel power post has been provided which supplies electrical power, music, etc and Internet access in parks, rest areas, etc. The power post of this invention is extremely durable and is tamper-proof as much as possible.

It can therefore be seen that the invention accomplishes at least all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

The invention claimed is:

1. A power post comprising: a hollow, vertically disposed post member having a lower end which is embedded in the ground, a closed upper end, a front wall, a back wall and opposite side walls; said front wall of said post member having a generally rectangular-shaped first opening formed therein adjacent said upper end thereof; an electrical outlet assembly positioned in said post member inwardly of said first opening; said electrical outlet assembly including at least one electrical receptacle facing said first opening; a housing positioned in said first opening; said housing including an upper end, a lower end, a back portion, a front portion, a top portion, a bottom portion and first and second side portions; said housing having a generally rectangular-shaped second opening formed therein extending between said front and back portions thereof; said housing being secured to said electrical outlet assembly whereby said electrical receptacle is positioned in said rectangular-shaped second opening adjacent said back portion of said housing; said front portion of said housing being positioned outwardly of said front wall of said post member; and a cover selectively closing said second opening at said front portion of said housing; each of said first and second side portions of said housing having a plurality of vertically disposed slots formed therein adjacent said front portion extending between top and bottom portions thereof; said cover having upper and lower ends, opposite side edges, an outer side and an inner side; said opposite side edges of said cover being vertically movably received by said slots in said first and second side portions of said housing; said cover being selectively slidably movable in said slots between open and closed positions; said cover being spaced from said electrical receptacle so that said cover may be moved to its said closed position when an electrical plug is inserted into said electrical receptacle.

2. The power post of claim 1 wherein said cover has an inwardly extending flange at its upper end which is adapted to sealably engage said upper end of said housing when in its said closed position.

3. The power post of claim 2 wherein said upper end of said housing has a recessed portion formed in said top portion thereof which receives said flange of said cover when said cover is in its said closed position.

4. The power post of claim 1 wherein said lower end of said housing has at least one opening formed therein to permit an electrical cord to be received therein.

5. The power post of claim 1 including means for locking said cover in its said closed position.

6. The power post of claim 1 wherein said post is comprised of galvanized steel which is powder coated.

7. The power post of claim 1 wherein a speaker is positioned in said front wall of said post member.

8. The power post of claim 7 wherein said speaker is positioned below said housing.

9. The power post of claim 7 wherein an Ethernet receptacle is also positioned in said front wall of said post member.

10. The power post of claim 7 wherein said speaker includes leads extending therefrom into the interior of said post member.

11. The power post of claim 1 wherein an Ethernet receptacle is positioned in said front wall of said post member.

12. The power post of claim 11 wherein said Ethernet receptacle is positioned below said housing.

13. The power post of claim 11 wherein said Ethernet receptacle includes a cover which normally closes said Ethernet receptacle.

14. The power post of claim 11 wherein said Ethernet receptacle includes leads extending therefrom into the interior of said post member.

15. The power post of claim 1 wherein said housing is secured to said post member.

16. The power post of claim 1 wherein said housing has a flange extending therefrom which extends around said housing and which is positioned against said front wall of said post member around said first opening.

17. The power post of claim 1 wherein at least one high voltage conduit is positioned in said post to enclose the electrical wires supplying power to said electrical outlet assembly.

* * * * *